(12) United States Patent
Kim et al.

(10) Patent No.: US 11,524,563 B2
(45) Date of Patent: Dec. 13, 2022

(54) POWER TRANSMISSION DEVICE FOR HYBRID VEHICLE

(71) Applicant: Hyundai Transys Inc., Hwaseong-si (KR)

(72) Inventors: Tae Hoon Kim, Hwaseong-si (KR); Yeon Ho Kim, Hwaseong-si (KR); Hyo Eun Kang, Hwaseong-si (KR)

(73) Assignee: Hyundai Transys Inc., Hwaseong-si (KR)

( * ) Notice: Subject to any disclaimer, the term of this patent is extended or adjusted under 35 U.S.C. 154(b) by 148 days.

(21) Appl. No.: 17/105,041

(22) Filed: Nov. 25, 2020

(65) Prior Publication Data

US 2021/0188073 A1   Jun. 24, 2021

(30) Foreign Application Priority Data

Dec. 20, 2019   (KR) .......................... 10-2019-0171349

(51) Int. Cl.
| | |
|---|---|
| *B60K 6/26* | (2007.10) |
| *B60K 6/405* | (2007.10) |
| *H02K 7/00* | (2006.01) |
| *H02K 7/108* | (2006.01) |

(52) U.S. Cl.
CPC ............... *B60K 6/26* (2013.01); *B60K 6/405* (2013.01); *H02K 7/006* (2013.01); *H02K 7/108* (2013.01); *B60K 2006/266* (2013.01); *B60K 2006/268* (2013.01); *B60Y 2200/92* (2013.01); *B60Y 2400/42* (2013.01); *B60Y 2400/46* (2013.01); *B60Y 2400/48* (2013.01); *B60Y 2400/60* (2013.01); *B60Y 2410/10* (2013.01)

(58) Field of Classification Search
CPC ... B60K 6/26; B60K 6/22; B60K 6/36; B60K 6/24; B60K 6/48; B60K 6/405; B60K 2006/268; B60K 2006/262; H02K 7/006; H02K 7/108; B60Y 2200/92; B60Y 2400/42; B60Y 2400/46; B60Y 2400/48; B60Y 2400/60; B60Y 2410/10; F16H 45/02; F16H 2045/0221
See application file for complete search history.

(56) References Cited

U.S. PATENT DOCUMENTS

| | | | |
|---|---|---|---|
| 2007/0007059 A1* | 1/2007 | Nomura .................. | B60L 50/61 180/65.29 |
| 2013/0151045 A1* | 6/2013 | Park ...................... | B60W 20/10 180/65.265 |

FOREIGN PATENT DOCUMENTS

| | | |
|---|---|---|
| JP | 2006-149129 A | 6/2006 |
| KR | 10-2009-0020791 A | 2/2007 |

* cited by examiner

*Primary Examiner* — Erez Gurari
(74) *Attorney, Agent, or Firm* — Saliwanchik, Lloyd & Eisenschenk

(57) ABSTRACT

A power transmission device for a hybrid vehicle may include: a cover part mounted on a vehicle body; two motor parts embedded in the cover part; two rotor parts mounted on the respective motor parts and rotated; a torsion damper part coupled to any one of the rotor parts, and connected to an engine part; a transfer part rotatably connected to the torsion damper part; a clutch part configured to selectively connect the other one of the rotor parts to the transfer part; and an output part connected to the clutch part, and configured to discharge power to a transmission.

10 Claims, 2 Drawing Sheets

POWER TRANSMISSION DEVICE FOR HYBRID VEHICLE

CROSS-REFERENCE TO RELATED APPLICATION

This application claims priority from and the benefit of Korean Patent Application No. 10-2019-0171349, filed on Dec. 20, 2019, which is hereby incorporated by reference for all purposes as if set forth herein.

BACKGROUND

Field

Exemplary embodiments of the present disclosure relate to a power transmission device for a hybrid vehicle, and more particularly, to a power transmission device for a hybrid vehicle, which can reduce the whole length thereof even though double motors are applied thereto.

Discussion of the Background

In general, a power transmission device for a hybrid vehicle has a layout in which an automatic transmission, a motor, an engine and an ISG (Integrated Starter & Generator) are arranged in a line.

A hybrid vehicle which uses an engine and motor is started by the motor. When the vehicle is driven at a predetermined speed, a generator, i.e. an ISG starts the engine in order to use an output of the engine and an output of the motor at the same time.

The motor used in the power transmission device for a hybrid vehicle may be driven for electric driving of the vehicle, when the engine is not driven at the initial stage.

Recently, a hybrid vehicle has been developed, which includes two or more motors installed therein, in addition to the hybrid vehicle including one motor installed therein. For example, when two motors are arranged in a power transmission device for a hybrid vehicle, a first motor may be driven to start an engine, and a second motor may be driven for electric driving of the vehicle.

In the conventional hybrid vehicle, however, a torsion damper which is necessarily used to absorb shock caused by drivability of the engine is disposed between the motor and the engine. Thus, the whole length of the power transmission device for a hybrid vehicle is increased, and a separate mass for supporting the torsion damper needs to be installed. Therefore, there is a need for a device capable of solving the problem.

The related art of the present disclosure is disclosed in Korean Patent Application No. 2009-0020791 published on Feb. 27, 2009 and entitled "Power Transmission Device for Hybrid Vehicle".

SUMMARY

Various embodiments are directed to a power transmission device for a hybrid vehicle, which can reduce the whole length thereof even though double motors are applied thereto.

In an embodiment, a power transmission device for a hybrid vehicle may include: a cover part mounted on a vehicle body; two motor parts embedded in the cover part; two rotor parts mounted on the respective motor parts and rotated; a torsion damper part coupled to any one of the rotor parts, and connected to an engine part; a transfer part rotatably connected to the torsion damper part; a clutch part configured to selectively connect the other one of the rotor parts to the transfer part; and an output part connected to the clutch part, and configured to discharge power to a transmission.

Each of the rotor parts may be disposed in the corresponding motor part, and the transfer part may be disposed on the rotation center axis of the rotor part.

The torsion damper part may be disposed between the rotor part and the transfer part.

The cover part may include: a cover outer wall having the motor parts mounted therein; and a cover inner wall extended inwardly from the cover outer wall.

The motor parts may include: a first motor part mounted in the cover part, and driven to start the engine part; and a second motor part mounted in the cover part, and driven to operate the vehicle.

The first motor part may be disposed closer to the engine part than the second motor part, and the second motor part may have larger power than the first motor part.

The rotor parts may include: a first rotor part rotated by the first motor part, and coupled to the torsion damper part; and a second rotor part rotated by the second motor part, and selectively connected to the clutch part.

The first rotor part may include: a first rotor rotation part rotated by the first motor part; a first rotor support part interlocked with the first rotor rotation part, and supported by the cover part; and a first rotor extension part extended from the first rotor support part, and supported by the cover part.

The second rotor part may include: a second rotor rotation part rotated by the second motor part; a second rotor support part interlocked with the second rotor rotation part, and supported by the cover part; and a second rotor extension part extended from the second rotor support part, and supported by the cover part.

The torsion damper part may include: a first damper part connected to the engine part, and welded to the first rotor part; and a second damper part connected to the first damper part, and spline-coupled to the transfer part.

In the power transmission device for a hybrid vehicle in accordance with the embodiment of the present disclosure, the torsion damper part may be disposed in the motor part, which makes it possible to reduce the whole length of the power transmission device. Furthermore, the torsion damper part may relieve shock applied to the engine part and the motor part.

DETAILED DESCRIPTION OF THE ILLUSTRATED EMBODIMENTS

Hereinafter, a power transmission device for a hybrid vehicle will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
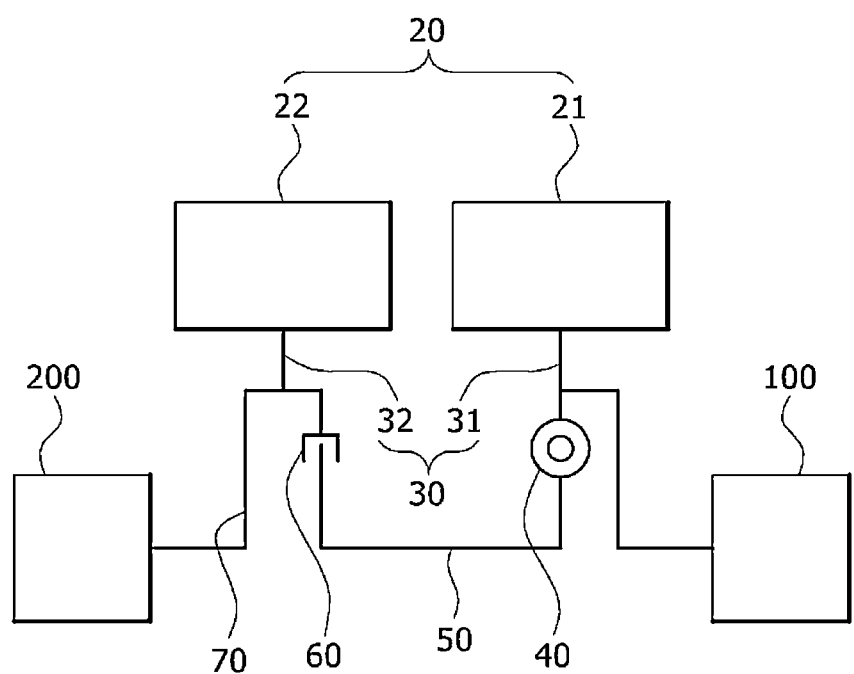
FIG. 1 is a block diagram schematically illustrating a power transmission device for a hybrid vehicle in accordance with an embodiment of the present disclosure.
Figure 2:
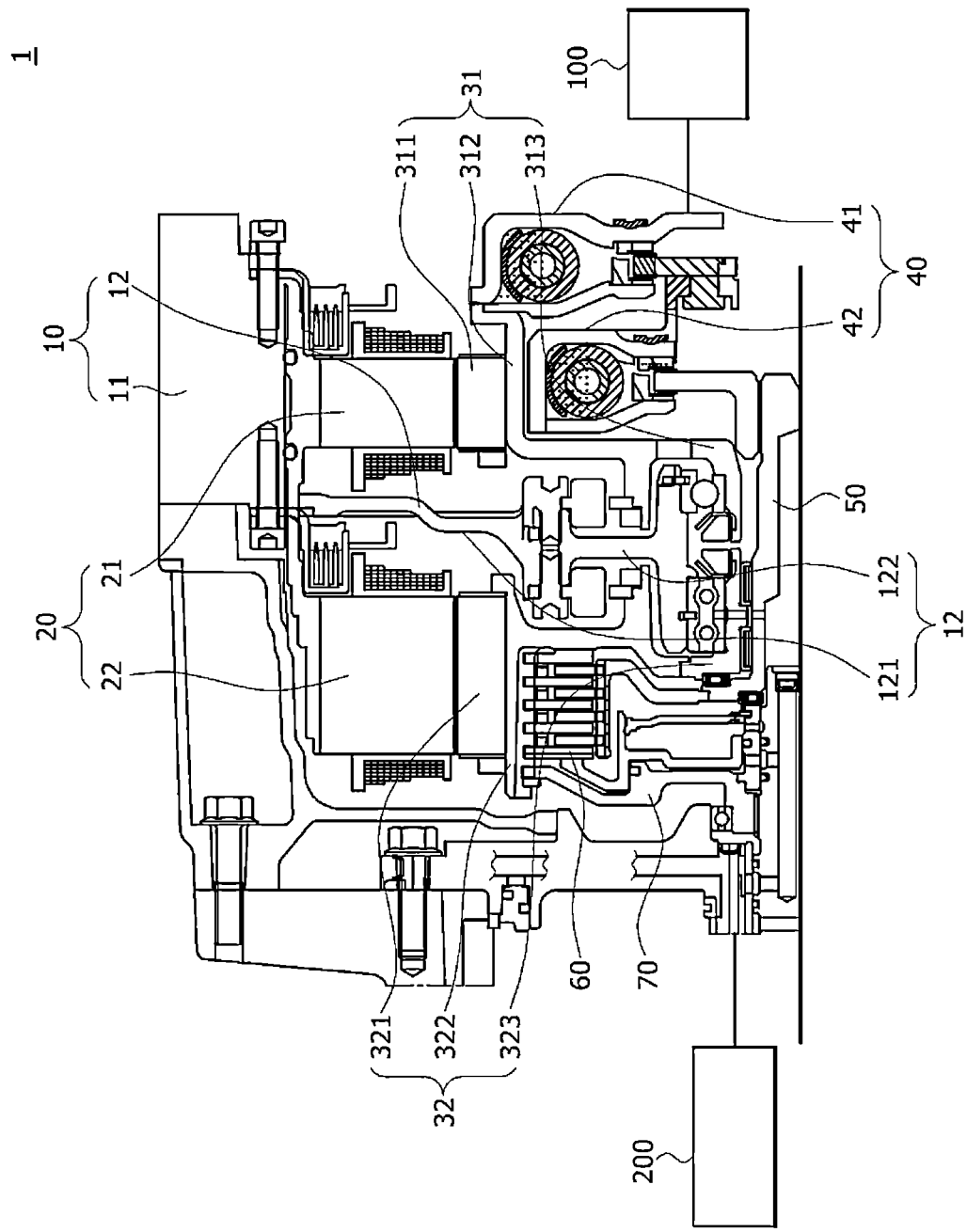
FIG. 2 is a cross-sectional view schematically illustrating the power transmission device for a hybrid vehicle in accordance with the embodiment of the present disclosure.

FIG. 1 is a block diagram schematically illustrating a power transmission device for a hybrid vehicle in accordance with an embodiment of the present disclosure, and FIG. 2 is a cross-sectional view schematically illustrating the power transmission device for a hybrid vehicle in accordance with the embodiment of the present disclosure. Referring to FIGS. 1 and 2, a power transmission device for a vehicle in accordance with the embodiment of the present disclosure includes a cover part 10, two motor parts 20, two rotor parts 30, a torsion damper part 40, a transfer part 50, a clutch part 60 and an output part 70.

The cover part 10 is mounted on a vehicle body. The motor parts 20 are embedded in the cover part 10, and driven when power is applied thereto. Any one of the two motor parts 20 may be used to start the vehicle, and the other one may be used to drive the vehicle.

The rotor parts 30 are mounted in the respective motor parts 20 and rotated. The torsion damper part 40 is coupled to any one of the rotor parts 30, and serves to relieve shock. The torsion damper part 40 is coupled to an engine part 100.

The transfer part 50 is rotatably connected to the torsion damper part 40. The transfer part 50 may transfer the rotational force of the engine part 100.

The clutch part 60 selectively connects the other of the rotor parts 30 to the transfer part 50. The output part 70 is connected to the clutch part 60 and discharges power to a transmission 200.

At this time, the torsion damper part 40 is disposed between the one of the rotor parts 30 and the transfer part 50. That is, the rotor parts 30 are disposed in the respective motor parts 20. The transfer part 50 is disposed on the rotation center axis of the rotor part 30. Furthermore, the torsion damper part 40 is disposed between the one of the rotor parts 30 and the transfer part 50. Such a structure can reduce the whole length of the power transmission device 1 for a hybrid vehicle.

The cover part 10 in accordance with the embodiment of the present disclosure includes a cover outer wall 11 and a cover inner wall 12.

The motor parts 20 are mounted in the cover outer wall 11. For example, the cover outer wall 11 may be fixed to the vehicle body, and have an internal space in which the motor parts 20, the rotor parts 30, the torsion damper part 40, the transfer part 50, the clutch part 60 and the output part 70 are embedded. The cover outer wall 11 may be connected to the transmission 200.

The cover inner wall 12 is extended inwardly from the cover outer wall 11. For example, the cover inner wall 12 may include a first inner wall 121 extended from the cover outer wall 11 and a second inner wall 122 extended from the first inner wall 121.

Oil in the transmission 200 may be introduced into the space between the cover outer wall 11 and the cover inner wall 12, in order to perform a cooling operation.

The motor parts 20 in accordance with the embodiment of the present disclosure include a first motor part 21 and a second motor part 22.

The first motor part 21 is mounted in the cover part 10, and driven to start the engine part 100. For example, the first motor part 21 may be disposed on the right side of the cover inner wall 12, and disposed closer to the engine part 100 than the second motor part 22.

The second motor part 22 is mounted in the cover part 10, and driven to operate the vehicle. For example, the second motor part 22 is disposed on the left side of the cover inner wall 12, and has a larger capacity than the first motor part 21. Thus, the second motor part 22 may provide larger power than the first motor part 21.

The rotor parts 30 in accordance with the embodiment of the present disclosure include a first rotor part 31 and a second rotor part 32.

The first rotor part 31 is rotated by the first motor part 21, and coupled to the torsion damper part 40. For example, the first rotor part 31 may include a first rotor rotation part 311 functioning as a rotor of the first motor part 21, and a first rotor support part 312 interlocked with the first rotor rotation part 311 and supported by the cover inner wall 12. The first rotor support part 312 has one end coupled to the torsion damper part 40 and the other end spline-coupled to the first inner wall 121.

In addition, the first rotor part 31 may further include a first rotor extension part 313. The first rotor extension part 313 may be extended from the first rotor support part 312, and supported by the second inner wall 122 through one or more bearings in order to suppress movement.

The second rotor part 32 is rotated by the second motor part 22, and selectively connected to the clutch part 60. For example, the second rotor part 32 may include a second rotor rotation part 321 functioning as a rotor of the second motor part 22, and a second rotor support part 322 interlocked with the second rotor rotation part 321 and supported by the cover inner wall 12. The second rotor support part 322 may be spline-coupled to the first inner wall 121.

In addition, the second rotor part 32 may further include a second rotor extension part 323. The second rotor extension part 323 may be extended from the second rotor support part 322, and supported by the second inner wall 122 through one or more bearings in order to suppress movement.

The torsion damper part 40 in accordance with the embodiment of the present disclosure may include a first damper part 41 and a second damper part 42. The first damper part 41 and the second damper part 42 may be connected to each other, and each include a spring to absorb vibration when power generated by the engine part 100 and the first motor part 21 is transferred.

The first damper part 41 is coupled to the engine part 100 and welded to the first rotor part 31. For example, the first damper part 41 may be coupled to the engine part 100, and then welded to the first rotor support part 312.

The second damper part 42 is connected to the first damper part 41, and spline-coupled to the transfer part 50. For example, when the first damper part 41 coupled to the engine part 100 is pressed against the first rotor support part 312 so as to be welded and coupled to the first rotor support part 312, the second damper part 42 may be spline-coupled to the outer circumferential surface of the transfer part 50, and thus transfer power.

The assembling process and the operation of the power transmission device for a hybrid vehicle in accordance with the embodiment of the present disclosure, which has the above-described structure, will be described as follows.

The second rotor part 32 is disposed in the second motor part 22, and the clutch part 60 is disposed between the transfer part 50 and the second rotor part 32. At this time, the second motor part 22 is mounted in the cover outer wall 11, and the second rotor part 32 is supported by the cover inner wall 12.

The first rotor part 31 is disposed in the first motor part 21. At this time, the first motor part 21 is mounted in the cover outer wall 11, and the first rotor part 31 is supported by the cover inner wall 12.

After the engine part 100 and the first damper part 41 are coupled to each other, the first and second damper parts 41 and 42 are disposed in the first rotor part 31. At this time, the second damper part 42 is spline-coupled to the transfer part 50, and the first damper part 41 is welded to the first rotor part 31.

According to the above-described assembly structure, the first damper part 41 and the second damper part 42 may be disposed in the first motor part 21, which makes it possible to expect that the whole length of the power transmission device can be reduced. Since the first rotor part 31 and the first damper part 41 are directly connected to each other through welding, a separate mass for a damper may be omitted. That is, since the first rotor part 31 coupled to the first damper part 41 has a considerable weight, the first rotor part 31 may function as a mass for a damper. Furthermore, the structure in which the first and second damper parts 41 and 42 are doubly connected may be adopted for low stiffness. Therefore, the weight of the first damper part 41 can be reduced, and the structure can be simplified.

When the second motor part 22 is driven, the second rotor part 32 may be rotated, and the output part 70 connected to the clutch part 60 may transfer the rotational force of the second rotor part 32 to the transmission 200, in order to drive the vehicle.

When the first motor part 21 is driven, the first rotor part 31 may be rotated, and the first damper part 41 connected to the first rotor part 31 may rotate the engine part 100 to induce a start-up of the engine part 100.

When the engine part 100 is driven, the rotational force of the engine part 100 may be transferred to the transfer part 50 through the first and second damper parts 41 and 42, and transferred to the output part 70 through the clutch part 60, in order to drive the vehicle.

In the power transmission device 1 for a hybrid vehicle in accordance with the embodiment of the present disclosure, the torsion damper part 40 is disposed in the motor part 20, which makes it possible to reduce the whole length of the power transmission device 1. Furthermore, the torsion damper part 40 may relieve shock applied to the engine part 100 and the motor part 20. As a person of ordinary skill in the art will understand, the cover part 10, motor part 20, rotor part 30, transfer part 50, clutch part 60, output part 70, engine part 100, first motor part 21, second motor part 22, first rotor part 31, second rotor part 32, rotor rotation part 311, 321, rotor extension part 313, 323, and rotor support part 321,322 can be a housing, motor, rotor, transfer shaft, clutch, output shaft, engine, first motor, second motor, first rotor, second rotor, rotor, output shaft, and connecting plate between the rotor and the output shaft, respectively.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A power transmission device for a hybrid vehicle, comprising:
   a housing mounted on a vehicle body of the hybrid vehicle;
   a first motor and a second motor embedded in the housing;
   a first rotor mounted on the first motor and configured to rotate;
   a second rotor mounted on the second motor and configured to rotate;
   a torsion damper coupled to the first rotor, and connected to an engine;
   a transfer shaft rotatably connected to the torsion damper;
   a clutch configured to selectively connect the second rotor to the transfer shaft; and
   a first output shaft connected to the clutch, and configured to discharge power to a transmission,
   wherein the torsion damper comprises:
      a first damper connected to the engine, and welded to the first rotor; and
      a second damper connected to the first damper, and spline-coupled to the transfer shaft.

2. The power transmission device of claim 1, wherein the first rotor is disposed in the first motor, and the second rotor is disposed in the second motor, and
   wherein the transfer shaft is disposed on a rotation center axis of the first rotor.

3. The power transmission device of claim 2, wherein the torsion damper is disposed between the first rotor and the transfer shaft.

4. The power transmission device of claim 1, wherein the housing comprises:
   a housing outer wall having the first and second motors mounted therein; and
   a housing inner wall extended inwardly from the housing outer wall.

5. The power transmission device of claim 1,
   wherein the first motor is driven to start the engine, and
   wherein the second motor is driven to operate the hybrid vehicle.

6. The power transmission device of claim 5, wherein the first motor is disposed closer to the engine than is the second motor, and
   wherein the second motor has a larger power than does the first motor.

7. The power transmission device of claim 5,
   wherein the first rotor is rotated by the first motor and is coupled to the torsion damper, and
   wherein the second rotor is rotated by the second motor and is selectively connected to the clutch.

8. A power transmission device for a hybrid vehicle, comprising:
   a housing mounted on a vehicle body of the hybrid vehicle;
   a first motor and a second motor embedded in the housing;
   a first rotor mounted on the first motor and configured to rotate;
   a second rotor mounted on the second motor and configured to rotate;
   a torsion damper coupled to the first rotor, and connected to an engine;
   a transfer shaft rotatably connected to the torsion damper;
   a clutch configured to selectively connect the second rotor to the transfer shaft; and
   a first output shaft connected to the clutch, and configured to discharge power to a transmission,
   wherein the first motor is driven to start the engine,
   wherein the second motor is driven to operate the hybrid vehicle,
   wherein the first rotor is rotated by the first motor and is coupled to the torsion damper,
   wherein the second rotor is rotated by the second motor and is selectively connected to the clutch, and wherein the power transmission device further comprises:
a first connection plate in direct physical contact with the first rotor; and
a second output shaft extended from the first connection plate.

9. The power transmission device of claim 7, wherein the power transmission device further comprises:
a second connection plate in direct physical contact with the second rotor rotation part; and
a third output shaft extended from the second connection plate.

10. A power transmission device for a hybrid vehicle, comprising:
a housing mounted on a vehicle body of the hybrid vehicle;
a first motor and a second motor embedded in the housing;
a first rotor mounted on the first motor and configured to rotate;
a second rotor mounted on the second motor and configured to rotate;
a torsion damper coupled to the first rotor, and connected to an engine;
a transfer shaft rotatably connected to the torsion damper;
a clutch configured to selectively connect the second rotor to the transfer shaft; and
a first output shaft connected to the clutch, and configured to discharge power to a transmission,
wherein the first motor is driven to start the engine,
wherein the second motor is driven to operate the hybrid vehicle,
wherein the first rotor is rotated by the first motor and is coupled to the torsion damper,
wherein the second rotor is rotated by the second motor and is selectively connected to the clutch, and
wherein the torsion damper comprises:
a first damper connected to the engine, and welded to the first rotor; and
a second damper connected to the first damper, and spline-coupled to the transfer shaft.

* * * * *